US010762665B2

(12) United States Patent
Kuo

(10) Patent No.: US 10,762,665 B2
(45) Date of Patent: Sep. 1, 2020

(54) SYSTEMS AND METHODS FOR PERFORMING VIRTUAL APPLICATION OF MAKEUP EFFECTS BASED ON A SOURCE IMAGE

(71) Applicant: Perfect Corp., New Taipei (TW)

(72) Inventor: Chia-Chen Kuo, Taipei (TW)

(73) Assignee: PERFECT CORP., New Taipei (TW)

( * ) Notice: Subject to any disclaimer, the term of this patent is extended or adjusted under 35 U.S.C. 154(b) by 86 days.

(21) Appl. No.: 16/117,081

(22) Filed: Aug. 30, 2018

(65) Prior Publication Data

US 2019/0362521 A1    Nov. 28, 2019

Related U.S. Application Data

(60) Provisional application No. 62/675,212, filed on May 23, 2018.

(51) Int. Cl.
*G06T 7/90* (2017.01)
*G06T 7/50* (2017.01)
(Continued)

(52) U.S. Cl.
CPC ............. *G06T 7/90* (2017.01); *G06T 7/11* (2017.01); *G06T 7/33* (2017.01); *G06T 7/50* (2017.01);
(Continued)

(58) Field of Classification Search
CPC ........... A45D 2044/007; A45D 44/005; G06K 2009/6213; G06K 9/00288;
(Continued)

(56) References Cited

U.S. PATENT DOCUMENTS 6,529,630 B1 *   3/2003   Kinjo ................. G06K 9/00228
                                                           382/118
7,634,103 B2    12/2009   Rubinstenn et al.
(Continued)

FOREIGN PATENT DOCUMENTS

CN    101673475 B    1/2013
CN    103714225 A    4/2014
(Continued)

OTHER PUBLICATIONS

Wut Yee Oo, "Digital Make-up Face Generation EE 368/ CS232: Digital Image Processing" (printed Aug. 29, 2018).
(Continued)

*Primary Examiner* — Jaime M Holliday
(74) *Attorney, Agent, or Firm* — McClure, Qualey & Rodack, LLP

(57) ABSTRACT

A computing device obtains a source image depicting a facial region having one or more makeup effects. The computing device performs facial alignment and defines a plurality of source regions having the one or more makeup effects, the source regions corresponding to facial features in the source image. The computing device extracts attributes of the one or more makeup effects for each source region and identifies a closest matching feature template for each source region based on the attributes. The computing device obtains a digital image of a facial region of a user. The computing device performs facial alignment and identifies a plurality of target regions corresponding to the plurality of source regions. The computing device applies a matching feature template of a corresponding source region to each of the target regions.

19 Claims, 7 Drawing Sheets

(51) Int. Cl.
*G06T 7/11* (2017.01)
*G06T 7/33* (2017.01)
*H04N 5/272* (2006.01)
*G06K 9/62* (2006.01)
*G06K 9/00* (2006.01)
*A45D 44/00* (2006.01)

(52) U.S. Cl.
CPC ........... *H04N 5/272* (2013.01); *A45D 44/005* (2013.01); *G06K 9/00281* (2013.01); *G06K 9/00288* (2013.01); *G06K 2009/6213* (2013.01); *G06T 2207/30201* (2013.01); *H04N 2005/2726* (2013.01)

(58) Field of Classification Search
CPC ...... G06K 9/00281; G06T 2207/30201; G06T 7/11; G06T 7/33; G06T 7/50; G06T 7/90; H04N 2005/2726; H04N 5/272
See application file for complete search history.

(56) References Cited

U.S. PATENT DOCUMENTS

| | | | |
|---|---|---|---|
| 8,208,764 B2 | 6/2012 | Guckenberger | |
| 8,908,904 B2 | 12/2014 | Santos et al. | |
| 9,058,765 B1* | 6/2015 | Mallick | G06F 3/0482 |
| 9,142,054 B2 | 9/2015 | Mallick et al. | |
| 2007/0196001 A1* | 8/2007 | Yanagawa | G06K 9/00288 382/118 |
| 2010/0172577 A1* | 7/2010 | Matsushita | G06K 9/00281 382/165 |
| 2012/0223956 A1 | 9/2012 | Saito et al. | |
| 2015/0050624 A1 | 2/2015 | Yamanashi et al. | |
| 2015/0086945 A1 | 3/2015 | Yamanashi et al. | |
| 2015/0118655 A1* | 4/2015 | Yamanashi | A45D 44/00 434/100 |
| 2016/0110587 A1 | 4/2016 | Han et al. | |
| 2018/0075524 A1 | 3/2018 | Sartori et al. | |
| 2019/0213420 A1* | 7/2019 | Karyodisa | G06K 9/00228 |

FOREIGN PATENT DOCUMENTS

| | | | |
|---|---|---|---|
| JP | 2001216386 A | 8/2001 | |
| JP | 2002092132 A | 3/2002 | |
| JP | 2010211308 A | 9/2010 | |
| JP | 2014191813 A | 10/2014 | |
| KR | 20140077752 A | 6/2014 | |
| WO | 2002017234 A1 | 2/2002 | |
| WO | 2008102440 A1 | 8/2008 | |
| WO | 2014118842 A1 | 8/2014 | |

OTHER PUBLICATIONS

Hollywood Makeover, https://www.instyle.com/makeover (printed Aug. 29, 2018).

Instant celebrity makeover, https://apps.allwomenstalk.com/makeover-apps-that-let-you-try-a-new-look-without-the-commitment/7, 2015.

Cunjian Chen et al. "Automatic Facial Makeup Detection with Application in Face Recognition", Appeared in Proc. of 6th IAPR International Conference on Biometrics (ICB), (Madrid, Spain), Jun. 2013.

Neslihan Kose et al., "Facial Makeup Detection Technique Based on Texture and Shape Analysis", May 2015.

Virtual Makeover, http://www.taaz.com/virtual-makeover#tab=completeLooks&piano=red&hairstyle=4770&completeLook=1091 (printed Aug. 29, 2018).

M. Abdullah-al-Wadud et al. "A Skin Detection Approach Based on Color Distance Map" Eurasip Journal on Advances in Signal Processing, vol. 2008, No. 1, Feb. 8, 2009, XP055579706.

European Search report issued in corresponding European patent application No. 18202890.2 dated Apr. 18, 2019.

* cited by examiner

SYSTEMS AND METHODS FOR PERFORMING VIRTUAL APPLICATION OF MAKEUP EFFECTS BASED ON A SOURCE IMAGE

CROSS-REFERENCE TO RELATED APPLICATION

This application claims priority to, and the benefit of, U.S. Provisional Patent Application entitled, "Method and system for applying makeup to digital images," having Ser. No. 62/675,212, filed on May 23, 2018, which is incorporated by reference in its entirety.

TECHNICAL FIELD

The present disclosure generally relates to systems and methods for performing virtual application of makeup products based on a source image.

BACKGROUND

Individuals invest a substantial amount of money in makeup tools and accessories. However, it can be challenging to achieve the same results as a makeup professional even with the aid of conventional self-help guides.

SUMMARY

In accordance with one embodiment, a computing device obtains a source image depicting a facial region having one or more makeup effects. The computing device performs facial alignment and defines a plurality of source regions having the one or more makeup effects, the source regions corresponding to facial features in the source image. The computing device extracts attributes of the one or more makeup effects for each source region and identifies a closest matching feature template for each source region based on the attributes. The computing device obtains a digital image of a facial region of a user. The computing device performs facial alignment and identifies a plurality of target regions corresponding to the plurality of source regions. The computing device applies a matching feature template of a corresponding source region to each of the target regions.

Another embodiment is a system that comprises a memory storing instructions and a processor coupled to the memory. The processor is configured by the instructions to obtain a source image depicting a facial region having one or more makeup effects. The processor is further configured to perform facial alignment and define a plurality of source regions having the one or more makeup effects, the source regions corresponding to facial features in the source image. The processor is further configured to extract attributes of the one or more makeup effects for each source region. The processor is further configured to identify a closest matching feature template for each source region based on the attributes and obtain a digital image of a facial region of a user. The processor is further configured to perform facial alignment and identify a plurality of target regions corresponding to the plurality of source regions. The processor is further configured to apply a matching feature template of a corresponding source region to each of the target regions.

Another embodiment is a non-transitory computer-readable storage medium storing instructions to be implemented by a computing device having a processor, wherein the instructions, when executed by the processor, cause the computing device to obtain a source image depicting a facial region having one or more makeup effects. The processor is further configured to perform facial alignment and define a plurality of source regions having the one or more makeup effects, the source regions corresponding to facial features in the source image. The processor is further configured to extract attributes of the one or more makeup effects for each source region. The processor is further configured to identify a closest matching feature template for each source region based on the attributes and obtain a digital image of a facial region of a user. The processor is further configured to perform facial alignment and identify a plurality of target regions corresponding to the plurality of source regions. The processor is further configured to apply a matching feature template of a corresponding source region to each of the target regions.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the disclosure can be better understood with reference to the following drawings. The components in the drawings are not necessarily to scale, with emphasis instead being placed upon clearly illustrating the principles of the present disclosure. Moreover, in the drawings, like reference numerals designate corresponding parts throughout the several views.

DETAILED DESCRIPTION

Although virtual makeup applications exist, the number of predefined makeup styles in such applications is limited. Therefore, it can be difficult for individuals to reproduce a desired makeup appearance found in an arbitrary image.

Various embodiments are disclosed for allowing users to closely replicate the makeup appearance of an individual depicted in a source image, where the source image may be found, for example, in a magazine or other print media, online marketing on the Internet, an advertisement shown on television, and so on.

Figure 1:
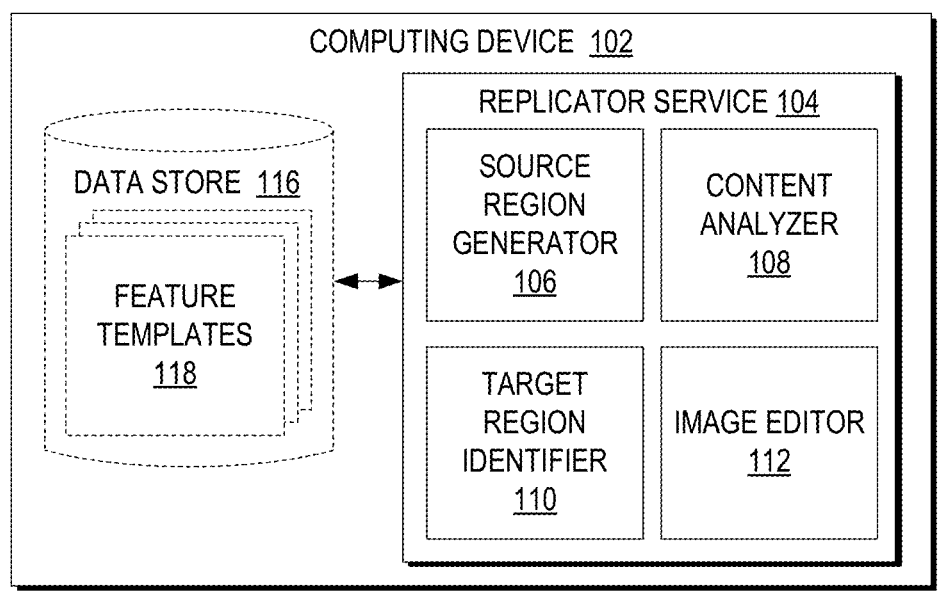
FIG. 1 is a block diagram of a computing device for performing virtual application of makeup effects based on a source image in accordance with various embodiments of the present disclosure.

A description of a system for performing virtual application of makeup effects based on a source image is now described followed by a discussion of the operation of the components within the system. FIG. 1 is a block diagram of a computing device 102 in which the techniques for virtual application of makeup effects based on a source image disclosed herein may be implemented. The computing device 102 may be embodied as a computing device such as, but not limited to, a smartphone, a tablet computing device, a laptop, and so on.

A replicator service 104 executes on a processor of the computing device 102 and includes a source region generator 106, a content analyzer 108, a target region identifier 110, and an image editor 112. The source region generator 106 is configured to obtain a source image from the user of the computing device 102, where the source image depicts a facial region having one or more makeup effects that the user wishes to replicate. The source image may be obtained from various sources such as, but not limited to, an advertisement in a magazine or other print media, a digital image associated with online marketing on the Internet, a snapshot of an advertisement shown on television, and so on.

As one of ordinary skill will appreciate, the source image may be encoded in any of a number of formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files or any number of other digital formats. Alternatively, the source image may be derived from a still image of a video encoded in formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), 360 degree video, 3D scan model, or any number of other digital formats.

The source region generator 106 is further configured to perform facial alignment and define source regions having the one or more makeup effects (e.g., eyeliner effect, eyeshadow effect, lipstick effect), where the source regions correspond to facial features in the source image. The content analyzer 108 is configured to process each of the source regions defined by the source region generator 106 where the content analyzer 108 extracts attributes of the one or more makeup effects for each source region. The content analyzer 108 is further configured to identify a closest matching feature template 118 for each source region based on the attributes, as described in more detail below. For some embodiments, predefined feature templates 118 are stored in a data store 116 of the computing device 102 where each feature template 118 defines a specific makeup effect. Each feature template 118 further comprises such attributes as the size, shape, the dominant color, color scheme, etc. associated with each makeup effect.

The target region identifier 110 is configured to obtain a digital image of a facial region of a user of the computing device 102. The target region identifier 110 is further configured to perform facial alignment and identify target regions corresponding to one or more of the source regions. The image editor 112 is configured to apply a matching feature template of a corresponding source region to each of the target regions.

Figure 2:
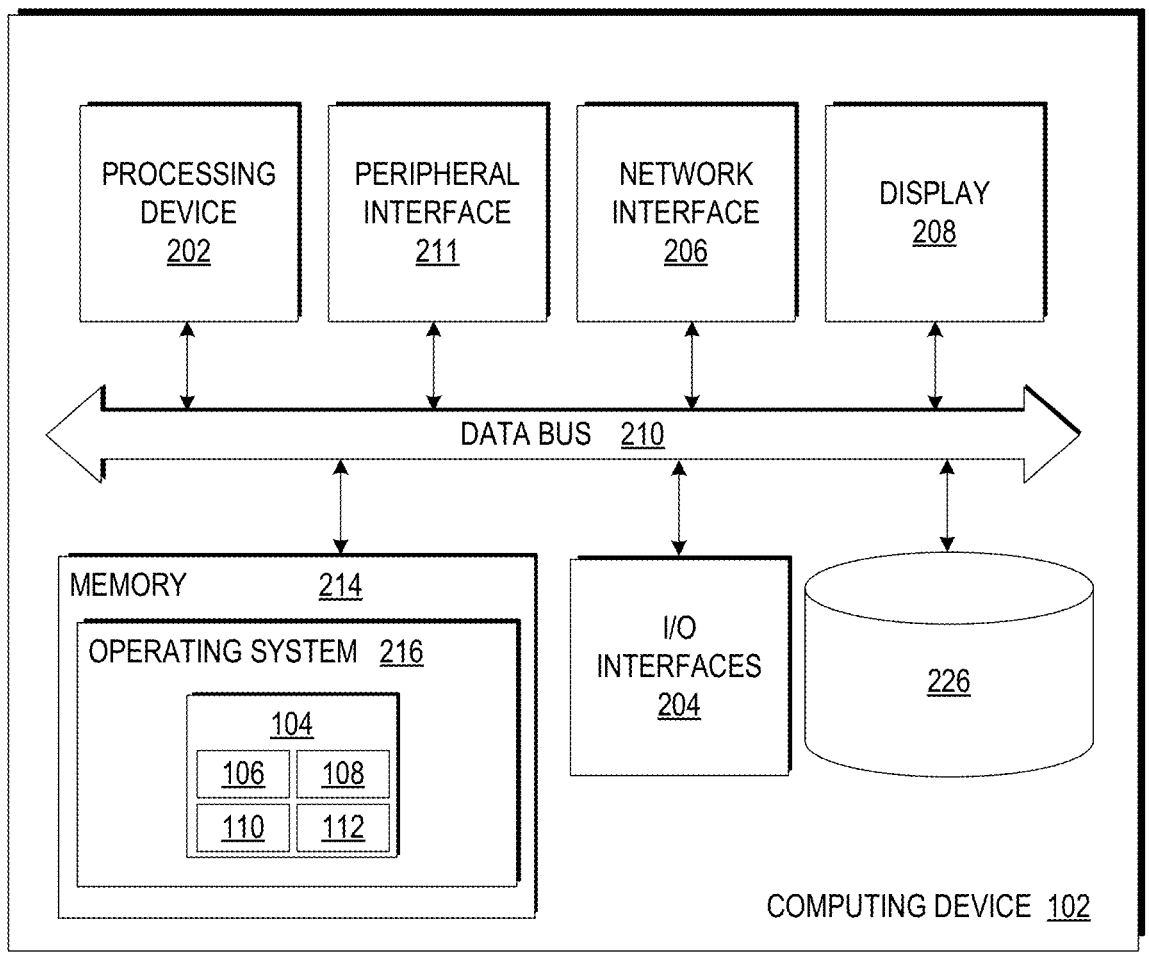
FIG. 2 is a schematic diagram of the computing device of FIG. 1 in accordance with various embodiments of the present disclosure.

FIG. 2 illustrates a schematic block diagram of the computing device 102 in FIG. 1. The computing device 102 may be embodied in any one of a wide variety of wired and/or wireless computing devices, such as a desktop computer, portable computer, dedicated server computer, multiprocessor computing device, smart phone, tablet, and so forth. As shown in FIG. 2, the computing device 102 comprises memory 214, a processing device 202, a number of input/output interfaces 204, a network interface 206, a display 208, a peripheral interface 211, and mass storage 226, wherein each of these components are connected across a local data bus 210.

The processing device 202 may include any custom made or commercially available processor, a central processing unit (CPU) or an auxiliary processor among several processors associated with the computing device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 may include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the computing device 102 depicted in FIG. 1. In accordance with such embodiments, the components are stored in memory 214 and executed by the processing device 202, thereby causing the processing device 202 to perform the operations/functions disclosed herein. One of ordinary skill in the art will appreciate that the memory 214 can, and typically will, comprise other components which have been omitted for purposes of brevity. For some embodiments, the components in the computing device 102 may be implemented by hardware and/or software.

Input/output interfaces 204 provide any number of interfaces for the input and output of data. For example, where the computing device 102 comprises a personal computer, these components may interface with one or more user input/output interfaces 204, which may comprise a keyboard or a mouse, as shown in FIG. 2. The display 208 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
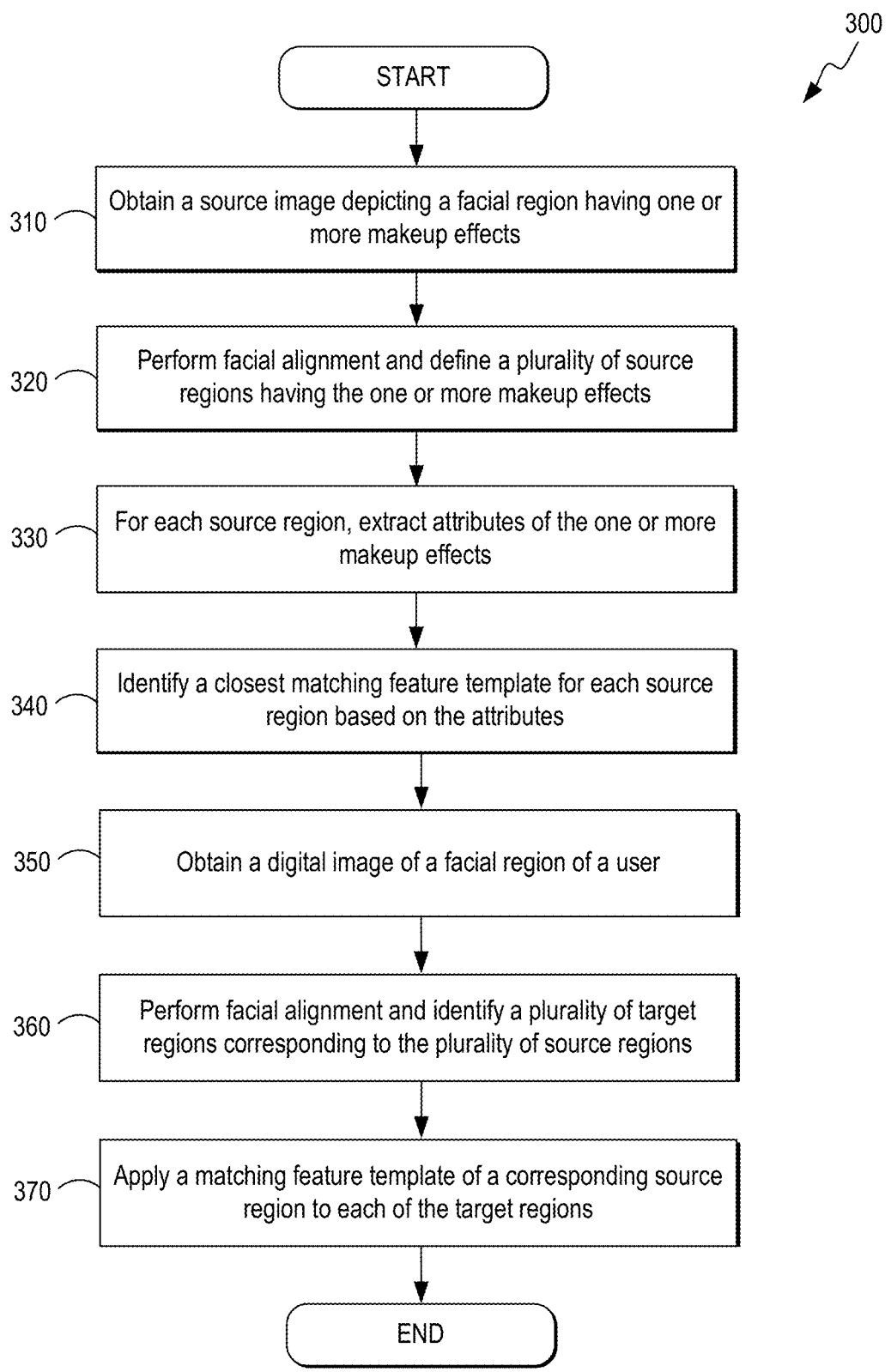
FIG. 3 is a top-level flowchart illustrating examples of functionality implemented as portions of the computing device of FIG. 1 for virtual application of makeup effects based on a source image according to various embodiments of the present disclosure.

Reference is made to FIG. 3, which is a flowchart 300 in accordance with various embodiments for virtual application of makeup effects based on a source image performed by the computing device 102 of FIG. 1. It is understood that the flowchart 300 of FIG. 3 provides merely an example of the different types of functional arrangements that may be employed to implement the operation of the various components of the computing device 102. As an alternative, the flowchart 300 of FIG. 3 may be viewed as depicting an example of steps of a method implemented in the computing device 102 according to one or more embodiments.

Although the flowchart 300 of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

At block 310, the computing device 102 obtains a source image depicting a facial region having one or more makeup effects. At block 320, the computing device 102 performs facial alignment and defines a plurality of source regions having the one or more makeup effects, where the source regions correspond to facial features in the source image. For some embodiments, the computing device 102 defines the plurality of source regions by segmenting the source image into a plurality of source regions based on a color clustering process.

At block 330, the computing device 102 extracts attributes of the one or more makeup effects for each source region. The attributes can include, for example, the shape of the source region. For such embodiments, the computing device 102 identifies the closest matching feature template based on the shape by detecting a skin tone of the facial region in the source image and defining the shape of the source region based on a threshold distance of pixel colors in the source image from the detected skin tone.

Figure 7:
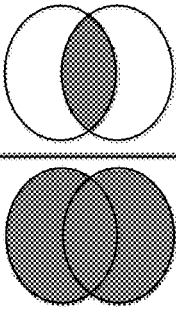
FIG. 7 illustrates definition of the shape of the source region based on a maximum IoU (Intersection of Union) metric by the computing device according to various embodiments of the present disclosure.

For some embodiments, the computing device 102 defines the shape of the source region based on the threshold distance of pixel colors by generating a distance map comprising RGB (red, green, blue) color distance values. With reference to FIG. 7, for some embodiments, the computing device 102 defines the shape of the source region based on a maximum IoU (Intersection of Union) metric, wherein the IoU metric is calculated based on an area of overlap and an area of union. The computing device 102 compares feature templates 118 in the data store 116 (FIG. 1) with the source region to identify a feature template with a maximum IoU (Intersection over Union), where the maximum IoU comprises the largest area of overlap. The computing device 102 then identifies the closest matching feature template for each source region based on a feature template having a closest matching shape.

For some embodiments, another one of the attributes discussed above can include a dominant color of the source region, where the computing device 102 identifies the closest matching feature template based on a feature template having a dominant color that most closely matches the dominant color of the source region. For some embodiments, the dominant color is determined by first decomposing the source image into reflectance and illumination components. The dominant color is then determined by analyzing the reflectance component of the source image.

For some embodiments, the computing device 102 identifies a closest matching feature template based on both the dominant color of the source region and the shape of the source region, where the computing device 102 identifies the closest matching feature template for each source region based on a feature template having a dominant color and a shape that most closely matches the dominant color and the shape of the source region. For such embodiments, the dominant color is determined based on a reflectance component of the source image, and the shape of the source region is determined based on a distance map generated by subtracting pixels colors of the source image from the dominant color.

Referring back to FIG. 3, at block 340, the computing device 102 identifies a closest matching feature template for each source region based on the attributes. At block 350, the computing device 102 obtains a digital image of a facial region of a user. At block 360, the computing device 102 performs facial alignment and identifies a plurality of target regions corresponding to the plurality of source regions. At block 370, the computing device 102 applies a matching feature template of a corresponding source region to each of the target regions. Thereafter, the process in FIG. 3 ends.

Figure 4:
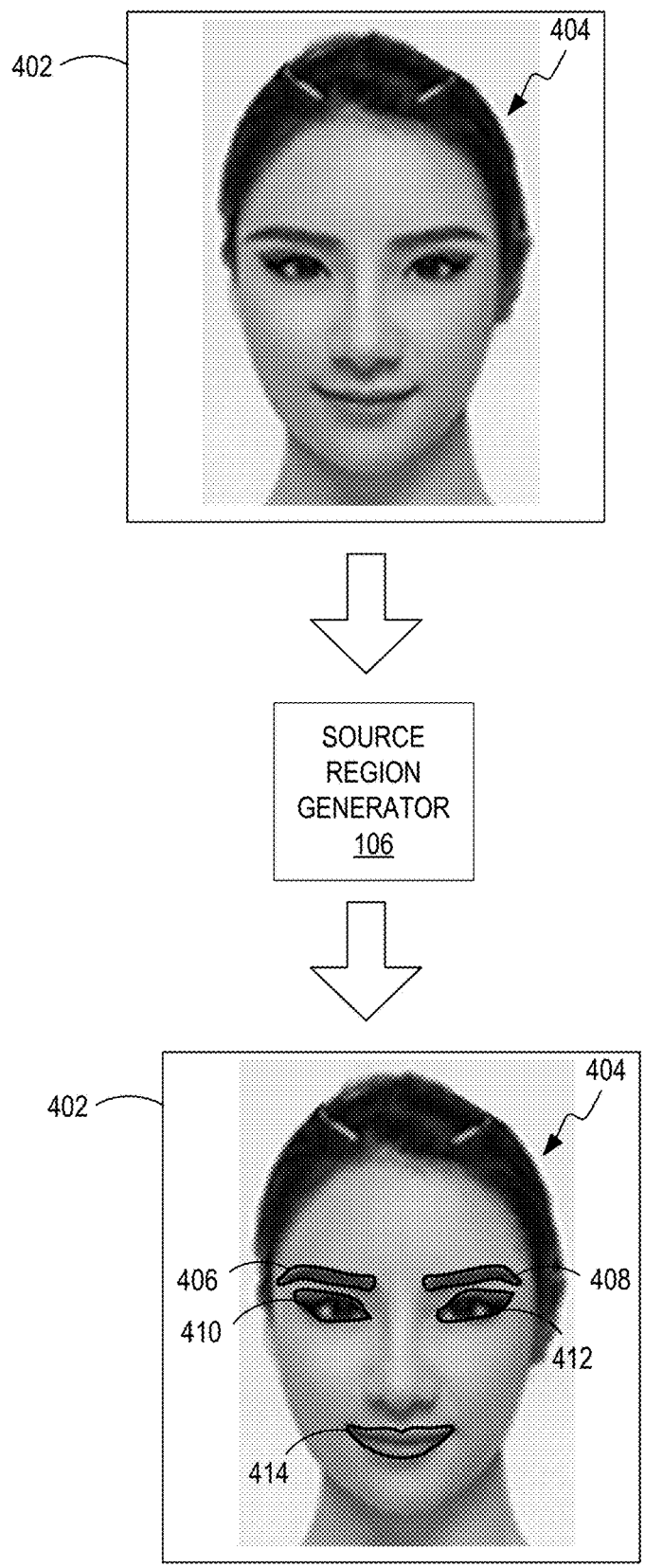
FIG. 4 illustrates generation of source regions in a source image by the computing device in FIG. 1 according to various embodiments of the present disclosure.

Having described the basic framework of a system for performing virtual application of makeup products based on a source image, reference is made to the following figures, which further illustrate various features disclosed above. Reference is made to FIG. 4, which shows generation of source regions in a source image 402 by the computing device 102 in FIG. 1. The source image 402 depicts a facial region 404 of an individual (e.g., model, celebrity) and may originate from such sources as an advertisement in a magazine or other print media, a digital image associated with online marketing on the Internet, a snapshot of an advertisement shown on television, and so on.

The source image 402 is input to the source region generator 106, which then generates source regions 406, 408, 410, 412, 414 within the facial region 404. The source regions 406, 408, 410, 412, 414 are generally identified by first identifying the skin color of the facial region. Areas within the facial region 404 that differ from the skin color are then designated as source regions 406, 408, 410, 412, 414. In accordance with various embodiments, the source region generator 106 identifies the locations of various features points in the facial region 404, where facial alignment is then performed to identify the source regions 406, 408, 410, 412, 414 within the facial region 404.

Figure 5:
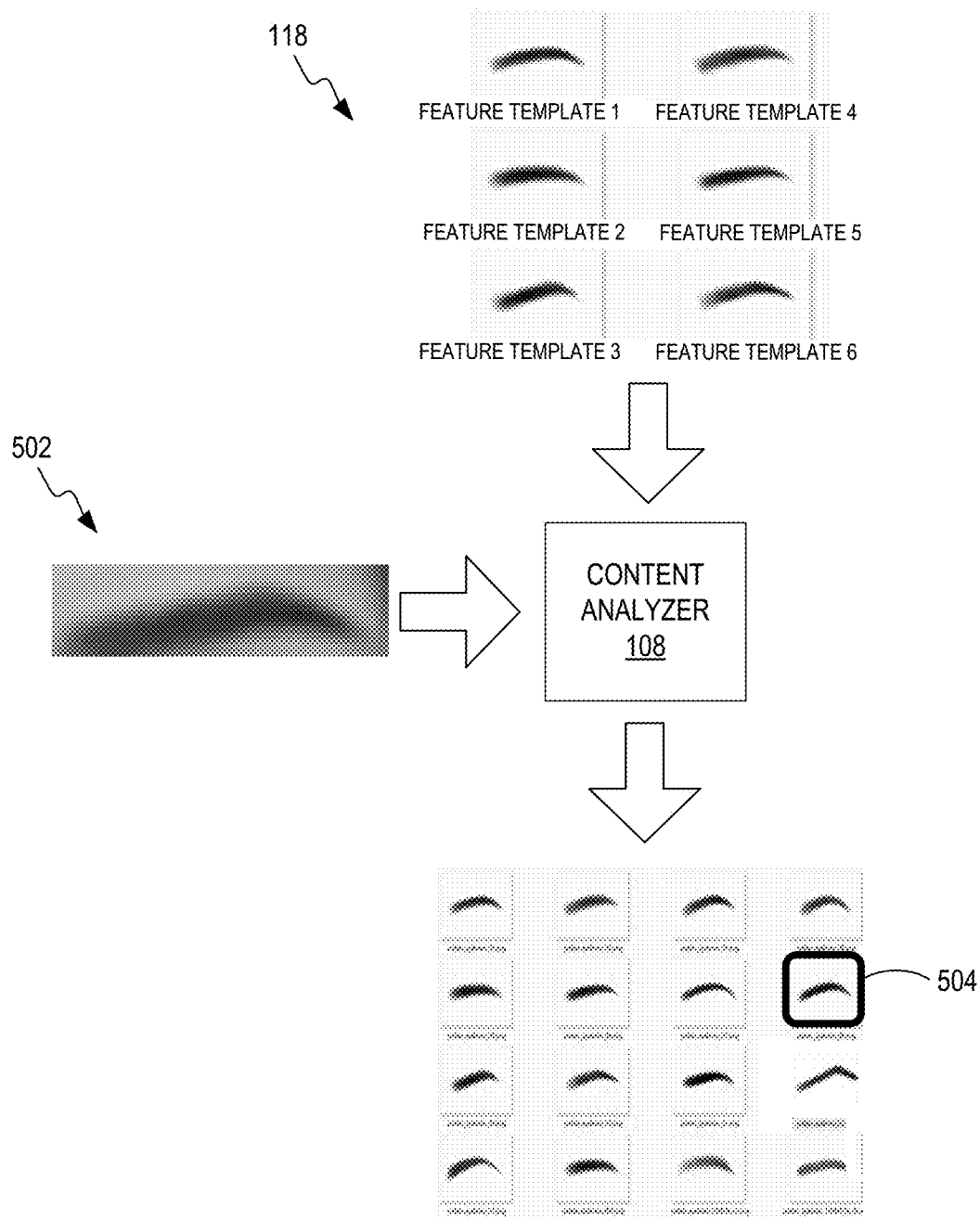
FIG. 5 illustrates identification of a matching feature template by the computing device in FIG. 1 according to various embodiments of the present disclosure.

The content analyzer 108 receives all the source regions 406, 408, 410, 412, 414 (FIG. 4) generated by the source region generator 106 and identifies a closest matching feature template 118 among those in the data store 116 (FIG. 1). Reference is made to FIG. 5, which illustrates identification of a matching feature template 118 corresponding to an eyebrow effect according to various embodiments. In the example shown, the content analyzer 108 in the computing device 102 identifies a closest matching feature template 118 based on one or more attributes of a current source region 502. In the example shown, the source region 502 corresponds to an eyebrow makeup effect.

As discussed above, the content analyzer 108 may identify the closest matching feature template 118 based on such attributes as the shape of the source region 502 and/or a dominant color of the source region 502, where the shape and dominant color of the source region 502 may be derived according to the various techniques disclosed above. As shown, the content analyzer 108 receives the source region 502 and the feature templates 118 as inputs and outputs a closest matching feature template 504 based on one or more attributes of the source region 502.

Figure 6:
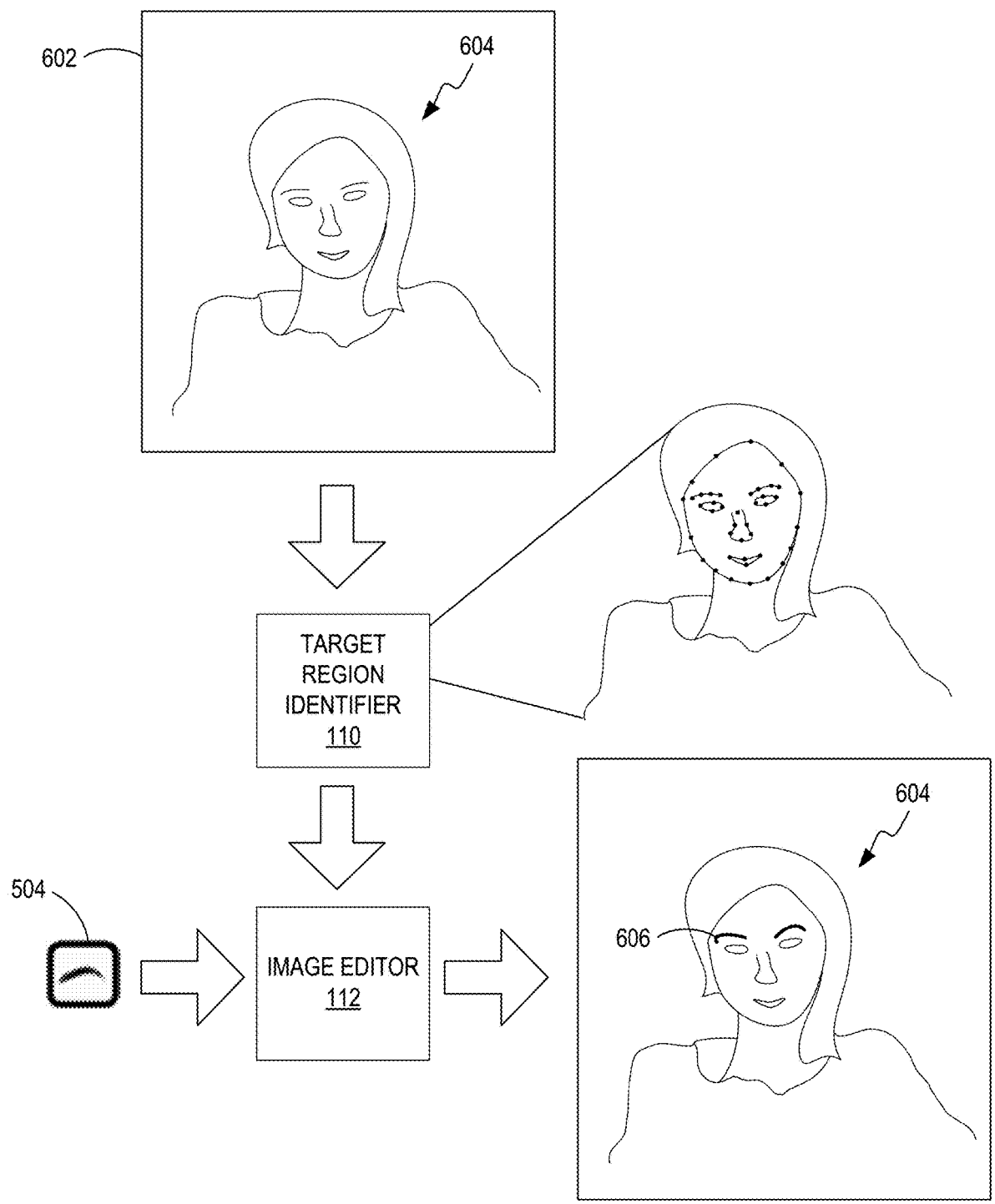
FIG. 6 illustrates identification of target regions by the computing device in FIG. 1, where virtual application of a makeup effect is applied based on the matching feature in accordance with various embodiments according to various embodiments of the present disclosure.

Reference is made to FIG. 6, which illustrates identification of target regions within a facial region of the user, where virtual application of a makeup effect is applied based on the matching feature in accordance with various embodiments. The computing device 102 in FIG. 1 obtains a digital image 602 of the user, where the digital image 602 depicts a facial region 604. The target region identifier 110 identifies features points within the facial region 604 and generates target regions that correspond to one or more of the generated source regions 406, 408, 410, 412, 414 (FIG. 4). The image editor 112 receives the identified target regions and one or more matching feature templates 504. In the example shown, the matching feature template 504 from FIG. 5 corresponding to an eyebrow effect is input to the image editor 112. The image editor 112 then performs virtual application of a makeup effect to replicate the same color and shape of the makeup effect depicted in the matching feature template 504.

As discussed above, each feature template 118 (FIG. 1) includes information that defines the size, shape, dominant color, color scheme, etc. associated with each makeup effect. In the example shown, the facial region 604 depicts a makeup effect 606 that replicates the makeup effect corresponding to the matching feature template 504. For some embodiments, product information for one or more makeup products associated with the makeup effect 606 is also provided to the user.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method implemented in a computing device, comprising:
   obtaining a source image depicting a facial region having one or more makeup effects;
   performing facial alignment and defining a plurality of source regions having the one or more makeup effects, the source regions corresponding to facial features in the source image;
   for each source region, extracting attributes of the one or more makeup effects;
   identifying a closest matching feature template for each source region based on the attributes, wherein one of the attributes comprises a shape of the source region, and wherein identifying the closest matching feature template for each source region based on the attributes comprises:
      defining the shape of the source region based on a maximum IoU (Intersection of Union) metric, wherein the IoU metric is calculated based on an area of overlap and an area of union, and wherein the maximum IoU comprises the largest area of overlap; and
      identifying the closest matching feature template for each source region based on a feature template having a closest matching shape;
   obtaining a digital image of a facial region of a user;
   performing facial alignment and identifying a plurality of target regions corresponding to the plurality of source regions; and
   applying a matching feature template of a corresponding source region to each of the target regions.

2. The method of claim 1, wherein defining the plurality of source regions comprises segmenting the source image into a plurality of source regions based on a color clustering process.

3. The method of claim 1, wherein one of the attributes comprises a shape of the source region, and wherein identifying the closest matching feature template for each source region based on the attributes comprises:
   detecting a skin tone of the facial region in the source image;
   defining the shape of the source region based on a threshold distance of pixel colors in the source image from the detected skin tone; and
   identifying the closest matching feature template for each source region based on a feature template having a closest matching shape.

4. The method of claim 3, wherein defining the shape of the source region based on the threshold distance of pixel colors in the source image from the detected skin tone comprises generating a distance map comprising color distance values.

5. The method of claim 1, wherein one of the attributes comprises a dominant color of the source region, and wherein identifying the closest matching feature template for each source region based on the attributes comprises identifying the closest matching feature template for each source region based on a feature template having a dominant color that most closely matches the dominant color of the source region.

6. The method of claim 5, wherein the dominant color is determined based on a reflectance component of the source image.

7. The method of claim 1, wherein one of the attributes comprises a dominant color and a shape of the source region, and wherein identifying the closest matching feature template for each source region based on the attributes comprises identifying the closest matching feature template for each source region based on a feature template having a dominant color and a shape that most closely matches the dominant color and the shape of the source region.

8. The method of claim 7, wherein the feature template having the shape that most closely matches the shape of the source region is determined based on a maximum IoU (Intersection of Union) metric, wherein the IoU metric is calculated based on an area of overlap and an area of union.

9. The method of claim 7, wherein the dominant color is determined based on a reflectance component of the source image, and wherein the shape of the source region is determined based on a distance map generated by subtracting pixels colors of the source image from the dominant color.

10. A system, comprising:
   a memory storing instructions;
   a processor coupled to the memory and configured by the instructions to at least:
      obtain a source image depicting a facial region having one or more makeup effects;

perform facial alignment and define a plurality of source regions having the one or more makeup effects, the source regions corresponding to facial features in the source image;

for each source region, extract attributes of the one or more makeup effects;

identify a closest matching feature template for each source region based on the attributes, wherein one of the attributes comprises a shape of the source region, and wherein identifying the closest matching feature template for each source region based on the attributes comprises:

defining the shape of the source region based on a maximum IoU (Intersection of Union) metric, wherein the IoU metric is calculated based on an area of overlap and an area of union, and wherein the maximum IoU comprises the largest area of overlap; and identifying the closest matching feature template for each source region based on a feature template having a closest matching shape;

obtain a digital image of a facial region of a user;

perform facial alignment and identify a plurality of target regions corresponding to the plurality of source regions; and apply a matching feature template of a corresponding source region to each of the target regions.

11. The system of claim 10, wherein one of the attributes comprises a shape of the source region, and wherein the processor identifies the closest matching feature template for each source region based on the attributes by:

detecting a skin tone of the facial region in the source image;

defining the shape of the source region based on a threshold distance of pixel colors in the source image from the detected skin tone; and identifying the closest matching feature template for each source region based on a feature template having a closest matching shape.

12. The system of claim 11, wherein the processor defines the shape of the source region based on the threshold distance of pixel colors by generating a distance map comprising color distance values.

13. The system of claim 10, wherein one of the attributes comprises a dominant color of the source region, and wherein the processor identifies the closest matching feature template for each source region by identifying the closest matching feature template for each source region based on a feature template having a dominant color that most closely matches the dominant color of the source region.

14. The system of claim 13, wherein the dominant color is determined based on a reflectance component of the source image.

15. The system of claim 10, wherein one of the attributes comprises a dominant color and a shape of the source region, and wherein the processor identifies the closest matching feature template for each source region by identifying the closest matching feature template for each source region based on a feature template having a dominant color and a shape that most closely matches the dominant color and the shape of the source region.

16. The system of claim 15, wherein the dominant color is determined based on a reflectance component of the source image, and wherein the shape of the source region is determined based on a distance map generated by subtracting pixels colors of the source image from the dominant color.

17. A non-transitory computer-readable storage medium storing instructions to be implemented by a computing device having a processor, wherein the instructions, when executed by the processor, cause the computing device to at least:

obtain a source image depicting a facial region having one or more makeup effects;

perform facial alignment and define a plurality of source regions having the one or more makeup effects, the source regions corresponding to facial features in the source image;

for each source region, extract attributes of the one or more makeup effects;

identify a closest matching feature template for each source region based on the attributes, wherein one of the attributes comprises a shape of the source region, and wherein identifying the closest matching feature template for each source region based on the attributes comprises:

defining the shape of the source region based on a maximum IoU (Intersection of Union) metric, wherein the IoU metric is calculated based on an area of overlap and an area of union, and wherein the maximum IoU comprises the largest area of overlap; and identifying the closest matching feature template for each source region based on a feature template having a closest matching shape;

obtain a digital image of a facial region of a user;

perform facial alignment and identify a plurality of target regions corresponding to the plurality of source regions; and apply a matching feature template of a corresponding source region to each of the target regions.

18. The non-transitory computer-readable storage medium of claim 17, wherein one of the attributes comprises a shape of the source region, and wherein the processor identifies the closest matching feature template for each source region based on the attributes by:

detecting a skin tone of the facial region in the source image;

defining the shape of the source region based on a threshold distance of pixel colors in the source image from the detected skin tone; and identifying the closest matching feature template for each source region based on a feature template having a closest matching shape.

19. The non-transitory computer-readable storage medium of claim 18, wherein the processor defines the shape of the source region based on the threshold distance of pixel colors by generating a distance map comprising color distance values.

* * * * *